United States Patent
Kohl et al.

(10) Patent No.: US 10,099,464 B2
(45) Date of Patent: Oct. 16, 2018

(54) TWO-COMPONENT HOT-MELT ADHESIVE

(71) Applicant: Henkel AG & Co. KGaA, Duesseldorf (DE)

(72) Inventors: Matthias Kohl, Weinheim (DE); Manfred Proebster, Nussloch (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/512,782

(22) Filed: Oct. 13, 2014

(65) Prior Publication Data
US 2015/0027634 A1    Jan. 29, 2015

Related U.S. Application Data

(63) Continuation of application No. PCT/EP2013/059165, filed on May 2, 2013.

(30) Foreign Application Priority Data

May 3, 2012   (DE) .................. 10 2012 207 333

(51) Int. Cl.
| | | |
|---|---|---|
| *C09J 183/00* | (2006.01) | |
| *B32B 37/12* | (2006.01) | |
| *C08G 65/336* | (2006.01) | |
| *C09J 171/02* | (2006.01) | |
| *C08L 67/00* | (2006.01) | |
| *C08L 77/00* | (2006.01) | |
| *C09J 7/35* | (2018.01) | |
| *C09J 183/16* | (2006.01) | |
| *C09J 123/00* | (2006.01) | |
| *C09J 125/00* | (2006.01) | |
| *C09J 125/04* | (2006.01) | |
| *C09J 133/12* | (2006.01) | |
| *C09J 133/10* | (2006.01) | |
| *C09J 133/08* | (2006.01) | |
| *C08K 5/04* | (2006.01) | |

(52) U.S. Cl.
CPC ........ *B32B 37/1207* (2013.01); *C08G 65/336* (2013.01); *C08L 67/00* (2013.01); *C08L 77/00* (2013.01); *C09J 171/02* (2013.01); *B32B 2323/00* (2013.01); *B32B 2333/08* (2013.01); *C08K 5/04* (2013.01); *C09J 7/35* (2018.01); *C09J 123/00* (2013.01); *C09J 125/00* (2013.01); *C09J 125/04* (2013.01); *C09J 133/08* (2013.01); *C09J 133/10* (2013.01); *C09J 133/12* (2013.01); *C09J 183/00* (2013.01); *C09J 183/16* (2013.01)

(58) Field of Classification Search
CPC . C09J 7/35; C09J 183/16; C09J 183/00; C09J 123/00; C09J 125/00; C09J 133/08; C08K 5/04

See application file for complete search history.

(56) References Cited

U.S. PATENT DOCUMENTS

| | | | | |
|---|---|---|---|---|
| 5,669,940 | A * | 9/1997 | Stubbs | B24D 3/28 156/279 |
| 8,101,681 | B2 | 1/2012 | Kohl et al. | |
| 8,362,123 | B2 | 1/2013 | Kohl et al. | |
| 2009/0291238 | A1 | 11/2009 | Scott et al. | |
| 2011/0116896 | A1 * | 5/2011 | Asano | F16B 15/08 411/442 |
| 2012/0055105 | A1 | 3/2012 | Kohl et al. | |
| 2013/0150530 | A1 * | 6/2013 | Fujimoto | C08G 65/336 525/100 |

FOREIGN PATENT DOCUMENTS

| | | | |
|---|---|---|---|
| CA | 2258585 | A1 | 12/1997 |
| EP | 2089490 | B1 | 7/2007 |
| WO | 9748778 | A1 | 12/1997 |
| WO | 2006128883 | A1 | 12/2006 |
| WO | 2010108716 | A1 | 9/2010 |
| WO | 2010139611 | A1 | 12/2010 |
| WO | 2011/152002 | * | 12/2011 |
| WO | 2011152002 | A1 | 12/2011 |

OTHER PUBLICATIONS

International Search Report for International Application No. PCT/EP2013/059165 dated Jun. 21, 2013.

* cited by examiner

*Primary Examiner* — Margaret G Moore
(74) *Attorney, Agent, or Firm* — James E. Piotrowski

(57) ABSTRACT

A moisture-curing two-component composition consisting of a component A containing at least one polyoxyalkylene, polyolefin and/or polyacrylate prepolymer having at least one hydrolysable silane group and at least one solid inert additive selected from hydrocarbons, polyesters or polyamides, a component B containing at least one crosslinking compound for the prepolymers, and auxiliary substances and additives in one or both components, the component A and the two-component composition each having hot-melt adhesive properties.

13 Claims, No Drawings

TWO-COMPONENT HOT-MELT ADHESIVE

The invention relates to two-component hot-melt adhesives which are solid at room temperature and which crosslink via hydrolysable silane groups. The invention also relates to a method for adhesive bonding with reactive two-component hot-melt adhesives.

Moisture-curing elastic adhesives and sealants are used in many sectors of industry. It is desirable for these adhesive bonds to be able to be produced on various substrates without the need for a pretreatment by means of a primer or by physical methods. Such adhesives and sealants based on silane-crosslinking prepolymers are known. They require water to crosslink and a catalyst to accelerate the reaction. Water can penetrate into the applied compounds by diffusion, the crosslinking rate being limited by the amount and diffusion distance of the water.

EP2089490 describes one-component adhesive compounds and sealant compounds consisting of a silane-functional polyoxyalkylene prepolymer and a silane-functional polyolefin. Various additives are added to this compound, for example the known Sn catalysts and other heavy metal catalysts. These compositions are highly viscous.

WO2010/139611 describes one-component or two-component adhesives, which crosslink via silane-functionalized polymers. Additional compounds containing silane groups are also added. According to the invention, however, these compositions are free from heavy metal catalysts. Said document also describes free-flowing materials which can be mixed at room temperature.

Adhesives according to the prior art can be two-component adhesives. The individual constituents are therefore stable in storage but have the disadvantage that they are still free-flowing immediately after being applied and thus do not result in an initial bond which is capable of withstanding loads. If moisture-curing one-component adhesives are used, hot-melt adhesives can also be selected. These demonstrate a rapid first build-up of adhesion, after which a final crosslinking occurs. This is limited by the rate of diffusion of the water in the adhesive. If NCO-crosslinking systems are used, it is known that an additional amount of water leads to the formation of bubbles; this has a detrimental effect on the functionality of the composition.

The object of the present invention is therefore to provide an adhesive and sealant composition which can crosslink on the basis of polymers having hydrolysable silane groups, wherein it is a two-component composition. The composition should produce a rapid initial adhesion, such that the parts to be adhesively bonded are held together. A rapid full cure of the composition should be ensured by the addition of crosslinking compounds. Furthermore, these compositions should produce a highly adhesive and elastic bonding of the substrates after crosslinking.

The object is achieved by means of a moisture-curing two-component composition consisting of a component A containing at least one polyoxyalkylene, polyolefin and/or polyacrylate prepolymer having at least one hydrolysable silane group and at least one solid inert additive selected from hydrocarbons, polyesters or polyamides, and a component B containing at least one crosslinking compound for the prepolymers, wherein auxiliary substances and additives can be contained in one or both components and wherein the two-component composition and component A have hot-melt adhesive properties.

The compositions according to the invention should take the form of a two-component hot-melt adhesive composition. They can be adhesives, sealants, potting compounds or coating agents, and they should be applied at elevated temperature. The components are stored separately. The various areas of application differ in terms of the physical parameters, which can be adapted to the application. The properties can be supported by additives, but molecular weight, polymer structure and viscosity are an important element. It is necessary according to the invention for the composition to contain at least one reactive polymer which can crosslink via silane groups.

The reactive prepolymers can be synthesized from known polymers as the backbone; when they are synthesized said polymers have a number of reactive groups which are suitable according to the invention or they are capable of being modified with such groups afterwards. Uncrosslinked, in particular linear, polymers, such as polyoxyalkylenes, polyolefins or poly(meth)acrylates are suitable as polymers. They must contain at least one, preferably at least two hydrolysable silane group(s).

A group of suitable prepolymers are those based on polyether polyols. These are generally known. They can be the known polyether polyols based on polyethylene oxide, polypropylene oxide or poly-THF, wherein mixtures with different building blocks can also be used. Di- or trifunctional polyether polymers based on polypropylene glycol or polyethylene glycol are suitable in particular. They are reacted at the end groups, for example, with silane groups to form the appropriately functionalized silane-crosslinking prepolymers. Various reactions for this purpose are known. The reaction can be performed for example by means of hydroxyl-group-containing polyether polyols, which are reacted with diisocyanates or polyisocyanates, which are then in turn reacted with amino-functional silanes or mercapto-functional silanes to form silane-terminated prepolymers. In another method the polyethers containing olefinically unsaturated groups are reacted with a mercaptosilane such as for example 3-mercaptopropyl trialkoxysilane. In a further mode of operation, hydroxy-functional polyethers having unsaturated chlorine compounds are reacted to polyethers having terminal olefinic double bonds, which are in turn reacted with hydrosilane compounds having hydrolysable groups in a hydrosilylation reaction to form silane-terminated polyethers.

Another embodiment of the composition according to the invention uses as prepolymers examples based on polyacrylates, which likewise have at least one hydrolysable silane group on the polymer chain. For this invention these should be understood to be polyacrylates and polymethacrylates. The poly(meth)acrylates which are suitable according to the invention are for example polymerization products of one or more alkyl (meth)acrylate esters having 1 to 18 C alcohols. Small proportions of (meth)acrylic acid or other copolymerizable monomers, for example styrene, vinyl esters and acrylamides, can optionally also be included. C1 to C12 (meth)acrylate esters are suitable in particular. Such polymers are known to the person skilled in the art and can be produced in various ways. (Meth)acrylate copolymers which are suitable according to the invention should have at least one, preferably two, in particular between 2 and 6 hydrolysable silane groups.

The silanes can be bound to the polymer framework by various production methods. For example, silanes containing an unsaturated residue and hydrolysable silane groups can be incorporated by polymerization. In this case the silane groups can then be randomly distributed along the polymer chain or block copolymers are obtained. In a different mode of operation, acrylate polymers having unsaturated groups are produced, the unsaturated double bonds then being reacted with silanes. In this case it is also possible to obtain such unsaturated groups and hence the silane groups in the terminal position on the acrylate copolymer. Silane groups can also be incorporated by polymer-analogous reactions of OH groups, for example.

Polyolefins containing silane groups on the polymer are also suitable. These silane groups can be incorporated directly into the polymer chain by polymerization via functionalized monomers, as already described above. However, they can also be incorporated by polymer-analogous reactions at functional groups in the polyolefin chain. Grafting reactions at the starting polymer are moreover also possible.

Di- or trialkoxysilane groups, preferably having C1 to C4 alkoxy groups, are suitable in particular as silane groups. In order to obtain a good crosslinking and adequate elasticity, the number of silane groups should be at least one per molecule, but in particular two to four groups are included. In a particular embodiment the silane groups are arranged terminally to a polyether chain. Functionalized polymers which are suitable according to the invention, preferably polyethers or poly(meth)acrylates, and which have an adequate number of silane groups are commercially available in various molecular weights or with varying chain structure.

In a preferred embodiment of the composition according to the invention the molecular weight (number-average molecular weight, $M_N$, determined by GPC) of the silane-functionalized prepolymers is between 2500 and 75,000 g/mol. Further particularly preferred molecular weight ranges are 3000 to 50,000 g/mol. These molecular weights are particularly advantageous, as compositions containing prepolymers with these molecular weights have viscosities which allow good processability. Prepolymers having a polydispersity D (measured as the index $M_W:M_N$) of less than 2, preferably less than 1.5, are most particularly preferably used. The selected polyoxyalkylene or poly(meth)acrylate prepolymers are usually liquid at room temperature (25° C.). The mixture of prepolymers should have a viscosity from 5000 to 100,000 mPas (measured by the Brookfield method, EN ISO 2555, 25° C.).

It is possible for the silane-containing prepolymers based on polyethers, polyolefins or polyacrylates to be used individually or also in a mixture, with a differing composition or molecular weight. In such a case it is important to ensure that the polymers are compatible. The compatibility can be influenced by the polymers themselves; for example acrylates containing proportions of relatively long-chain alkyl acrylates as the monomer component have greater non-polar properties.

As a further component that is necessary according to the invention, at least one inert additive, preferably having a softening point from 40 to 150° C. (measured in accordance with DIN ISO 4625), is included. This component is solid at room temperature (25° C.). It can be melted and then solidifies again quickly on cooling. This component can consist of solid polyesters, solid polyamides and/or solid hydrocarbon resins, which can take the form of polymers or oligomers. It is possible for these additives also to contain functional groups, but inert polymers containing no groups which react with the silane groups of the polymers, and in particular no silane groups, should be selected.

Examples of additives for use according to the invention are polyesters and also polyester polyols having a molecular weight ($M_N$) from around 500 to around 10,000 g/mol. Polyesters formed by reacting low-molecular-weight alcohols, in particular ethylene glycol, diethylene glycol, neopentyl glycol, hexanediol, butanediol, propylene glycol, glycerol or trimethylolpropane, with caprolactone can be used. Likewise suitable as polyfunctional alcohols for producing polyesters are 1,4-hydroxymethylcyclohexane, 2-methyl-1,3-propanediol, butanetriol-1,2,4, triethylene glycol, tetraethylene glycol, polyethylene glycol, dipropylene glycol, polypropylene glycol, dibutylene glycol and polybutylene glycol.

Suitable polyesters can be produced by polycondensation. Thus difunctional and/or trifunctional alcohols having a deficiency of dicarboxylic acids and/or tricarboxylic acids or the reactive derivatives thereof can be condensed to form polyester polyols. Suitable dicarboxylic acids are for example succinic acid and the higher homologs thereof having up to 16 C atoms, also unsaturated dicarboxylic acids such as maleic acid or fumaric acid, as well as aromatic dicarboxylic acids, in particular the isomeric phthalic acids, such as phthalic acid, isophthalic acid or terephthalic acid. Citric acid or trimellitic acid, for example, are suitable as tricarboxylic acids. Particularly suitable alcohols are hexanediol, ethylene glycol, diethylene glycol or neopentyl glycol or mixtures of two or more thereof. Particularly suitable acids are isophthalic acid or adipic acid or a mixture thereof.

The polyesters can have OH groups in the terminal position, and they can also contain carboxyl groups. They can be linear polyesters, but branched polyesters can also be used. They can be polymers, and mixtures of polymers of differing compositions or molecular weights can also be used. The softening temperature can be influenced by the choice of constituents. Thus aromatic components raise the softening temperature, while branched or aliphatic constituents lower the softening point. Crystalline polyesters are preferred.

Another class of additives which are suitable according to the invention and which are solid at room temperature are hydrocarbon resins. These are natural, optionally also modified, or synthetic polymers. A particular group of suitable hydrocarbon resins are polyolefin resins. The synthetic resins are generally obtained by polymerization or polycondensation, while natural resins can be separated off and produced from natural products. It is also possible for the nature of these resins to be modified by chemical reactions. Examples of such additives are pentadiene, terpene, coumarone-indene and furan resins, aliphatic or alicyclic petroleum hydrocarbon resins and hydrogenated derivatives thereof, styrene copolymer resins or resins based on functional hydrocarbon resins. These can be used individually or as a mixture. Within the meaning of this application, unless expressly indicated otherwise, room temperature is understood to be 25° C.

Furthermore, polyamides can be used as solid additives. Such polyamides can be produced for example by reacting primary diamines with dicarboxylic acids. The dicarboxylic acids are preferably used in a stoichiometric excess of up to 10% relative to the diamines, such that carboxyl-terminated polyamides are formed. C2-C14 dicarboxylic acids for example are suitable as dicarboxylic acids, or also dimeric or polymeric fatty acids, which are produced in a known manner by dimerization of unsaturated, long-chain fatty acids obtained from natural raw materials and which can then be further purified by distillation. Examples of dicarboxylic acids are in particular succinic acid, glutaric acid, adipic acid, pimelic acid, suberic acid, azelaic acid, sebacic acid, undecanedioic acid or dodecanedioic acid or also aromatic dicarboxylic acids, such as for example terephthalic acid, as well as mixtures of the aforementioned dicarboxylic acids. In particular, however, polyamides whose acid component comprises at least over 50% dimeric fatty acids and in particular only dimeric fatty acids, are suitable.

The amine component consists substantially of one or more aliphatic diamines, preferably with an even number of carbon atoms, the amino groups being at the ends of the carbon chains. The aliphatic diamines can contain 2 to 20 carbon atoms, wherein the aliphatic chain can be linear or slightly branched. The amine component can moreover contain cyclic diamines or polyoxyalkylene diamines, such as for example polyoxyethylene diamines, polyoxypropylene diamines or bis(diaminopropyl)polytetrahydrofuran. The hardness and melting point of the polyamides can be influenced by the choice of amine component. Polyamides having suitable properties are known to the person skilled in the art and are available commercially. They are for example amides which melt at temperatures below 200° C., based in particular on fatty acids, and polyamide waxes or micronized polyamides can also be selected.

The softening point of the additives should be between 40 and 150° C. (measured in accordance with ASTM E2867, ring and ball). In particular the softening point should be between 60 and 150° C., particularly preferably over 70° C.

The amount of solid additives should be from 0.1 to 20 wt. %, in particular from 0.5 to 10 wt. %, relative to the composition. Individual additives or mixtures can be used. It is advantageous if the additives are finely dispersed in component A.

The composition according to the invention can moreover contain auxiliary substances and additives. These can be present in one or both components. They can be for example plasticizers, such as mineral oils, white oils, paraffinic hydrocarbons, phthalates or adipates; stabilizers such as antioxidants, UV stabilizers or hydrolysis stabilizers; fillers, pigments, such as pyrogenic silicas, zeolites, bentonites, magnesium carbonate, kieselguhr, alumina, clay, talc, barytes, titanium dioxide, iron oxide, zinc oxide, sand, quartz, flint, mica, aluminum powder, glass powder; thinners or reactive thinners, desiccants, such as hydrolysable silane compounds; adhesion promoters, in particular organofunctional silanes such as hydroxy-functional, (meth)acryloxy-functional, mercapto-functional, amino-functional or epoxy-functional silanes; fungicides, flame retardants, catalysts, rheological auxiliary agents, colored pigments or colored pastes.

All known compounds that are capable of catalyzing the hydrolytic cleavage of the hydrolysable groups of the silane groupings and the subsequent fusing of the Si—OH group to siloxane groupings (crosslinking reaction or adhesion-promoting function) can be used as catalysts. Examples are titanates, such as tetrabutyl titanate or titanium tetraacetyl acetonate; bismuth compounds, such as bismuth tris-2-ethyl hexanoate; tin carboxylates, such as dibutyl tin dilaurate (DBTL), dibutyl tin diacetate or dibutyl tin diethyl hexanoate; tin oxides such as dibutyl tin oxide and dioctyl tin oxide; organoaluminum compounds such as aluminum tris-acetyl acetonate; chelate compounds such as zirconium tetraacetyl acetonate; amine compounds or salts thereof with carboxylic acids, such as octylamine, cyclohexylamine, benzylamine, dibutylamine, monoethanolamine, triethanolamine, diethylene triamine, triethylene tetramine, triethylene diamine, guanidine, morpholine, N-methyl morpholine and 1,8-diazabicyclo-(5,4,0)-undecene-7 (DBU), silane adhesion promoters with amino groups. One embodiment is free from metal catalysts, another uses the catalyst, preferably mixtures of a plurality of catalysts, in an amount from 0.01 to approximately 5 wt. %, relative to the total weight of the composition. Amounts of catalyst from 0.1 to 4 wt. % are preferred, particularly preferably less than 0.4 to 3 wt. %.

According to the invention component A has hot-melt adhesive properties. It is solid at 25° C., the softening point is usually over 70° C., preferably over 80° C. to 150° C. After cooling it forms a solid compound again having adhesive properties and in principle it allows for an adhesive bond.

According to the invention the composition consists of component A and a further component B. The latter contains compounds which can crosslink with the silane groups of the prepolymers. These can be silane-crosslinking polymers having at least two reactive groups which can react with the silane groups of the prepolymers of component A. They can for example likewise be a polyether or poly(meth)acrylate prepolymer having silane groups, but these should be free-flowing. Monomeric or oligomeric silane compounds can also be included. In particular, however, water is contained in component B as a crosslinking agent. In order to obtain a good miscibility with component A and moreover to ensure that B is stable in storage, component B should additionally contain polymers and additives having a solubility or absorption capacity for water.

They can be polar liquids, for example hygroscopic liquids, but fillers having a high absorption capacity for water can also be used, and inorganic or organic thickeners are moreover suitable. It is also possible for part of the water to have been pre-reacted with silane compounds to form silanol groups.

One embodiment uses thickening agents, for example water-soluble or water-swellable polymers or inorganic thickening agents. Examples of organic natural thickening agents are agar-agar, carrageen, tragacanth, gum arabic, alginates, pectins, polyoses, guar meal, starch, dextrins, gelatin, casein. Examples of organic fully or partially synthetic thickening agents are poly(meth)acrylic acid derivatives, carboxymethyl cellulose, cellulose ethers, hydroxyethyl cellulose, hydroxypropyl cellulose, polyvinyl ethers, polyvinyl alcohol, polyamides, polyimines. Examples of inorganic thickening agents or fillers are polysilicas, highly dispersed, pyrogenic, hydrophilic silicas, clay minerals such as montmorillonite, kaolinite, halloysite, aluminum hydroxide, aluminum oxide hydrate, aluminum silicates, talc, quartz minerals, chalk, magnesium hydroxide or molecular sieves of various pore sizes. Another embodiment uses polyols, for example glycerol or low-molecular-weight polyethylene glycols. Mixtures of different water-bearing compounds can also be included.

Component B is in liquid or paste form at room temperature. It should have a viscosity from 5000 to 800,000 mPas (25° C.) (measured by the Brookfield method, EN ISO 2555, 25° C.). The constituents in the individual components are chosen such that the ratio of A:B (weight) is from 10:3 to 10:0.1. A good measurability of the mixing ratio can be obtained in this way, and moreover after being mixed the composition still has the properties of a hot-melt adhesive.

A preferred embodiment of component A can contain: 10 to 50 wt. %, preferably 10 to 40 wt. % of one or more silane group-containing prepolymers, in particular polyoxyalkylene polymers and/or poly(meth)acrylate polymer, 0.5 to 15 wt. %, preferably 0.5 to 10 wt. % of at least one additive which is solid at room temperature and which contains no group which is crosslinkable with silane groups, 5 to 65 wt. %, preferably 20 to 60 wt. % of pigments and fillers, and 0.01 to 25 wt. % of auxiliary substances and additives, in particular adhesion promoters, stabilizers and/or plasticizers.

Component B preferably contains 0 to 30 wt. % of one or more silane group-containing compounds, 2 to 60 wt. % of one or more solid water-absorbing substances, preferably thickeners, fillers or molecular sieve, 10 to 60 wt. % of auxiliary substances and additives, in particular catalysts, hygroscopic solvents and/or plasticizers, and 0.5 to 15 wt. % of water. The sum of all constituents of a component should be 100 wt. % in each case.

The composition according to the invention and its components can be produced by mixing the constituents. It can be necessary to mix the constituents at elevated temperature to obtain a melt. It is likewise possible to produce the composition continuously in an extruder. The sequence of addition and mixing is dependent on the viscosity, consistency and amount of the individual constituents. The solids should be uniformly dispersed in the liquid constituents. A good mix must be ensured to prevent the individual constituents from separating. The manner of production is known in principle; the person skilled in the art can easily determine it according to the choice of raw materials.

The composition according to the invention of component A is solid (25° C.); it is hot-melt adhesive. When mixed with component B it forms a hot-melt adhesive. This preferably has a softening temperature above 60° C. The compositions according to the invention should conveniently contain no solvents having a boiling point of less than 150° C. At a temperature of between 60 and 120° C., for example, the viscosity of the hot-melt adhesive should be from 10 to 400 Pas. The application viscosity can be influenced by the application temperature. Through the choice of components an adhesive is obtained which is solid at room temperature, has a low viscosity at the application temperature, cools after being applied and then quickly gives rise to a high initial strength.

Components A and B can be mixed using known equipment. For example, component A is melted. Component B can then be metered into the melt with an extruder, for example. In another mode of operation component B is mixed into the melt of A in a static mixer. It can also be convenient to heat component B to ensure a greater ease of mixing. The mixing and application temperature of the two-component composition should be between 70 and 135° C. The temperature should preferably be less than 125° C., in order to prevent a possible evaporation and foaming of water. The composition can be used immediately after mixing, for example as an adhesive or sealant.

It has been found that the composition according to the invention has an outstanding initial strength. The application of other highly viscous adhesives which adhesively bond to the substrates by chemical reaction is known. However, they do not solidify at room temperature by cooling and instead retain a flowability. As a consequence, adhesively bonded parts can still be moved relative to one another until crosslinking takes place. A composition according to the invention has an outstanding initial strength after cooling and solidification of the melt.

The hot-melt composition according to the invention has a good crosslinking reaction. In contrast to known hot-melt adhesives, a consistently fast crosslinking is achieved even in thick layers. As the crosslinker component is mixed in homogeneously, a uniform cure is observed. Curing can also take place under processing conditions in which water-based crosslinking is retarded.

The two-component composition according to the invention can be used for various applications. For example, the composition according to the invention is used as a fast-crosslinking hot-melt adhesive. The adhesive can be applied in the form of a bead. Then the substrates are joined together. On cooling the melt solidifies again and quickly develops a good initial strength (green strength). The adhesively bonded part can then be transported, stored or processed. The adhesive force is sufficient to prevent the adhesively bonded parts from slipping in conventional processing operations.

Another embodiment is the application of the composition according to the invention as a sealant. The mixture can be introduced into preformed gaps, grooves or joints. A high initial strength is then established by cooling, and crosslinking is accelerated.

Another possible application is the use as a potting compound. For example, various substrates can be arranged in a predetermined mold and then fixed with the liquid composition. An accelerated full cure allows for an elevated cycle rate.

The compositions according to the invention can be used for adhesively bonding various substrates. For example, rigid substrates such as glass, aluminum, metal, ceramics, plastics or wooden substrates, optionally also with painted surfaces or other coated surfaces, can be adhesively bonded to one another. Moreover, flexible substrates such as plastic films or metal foils can also be adhesively bonded to one another or to solid substrates. Full-surface adhesive bonds can be produced, and it is likewise possible to apply a line of the adhesive according to the invention to the edge of solid substrates, a restricted area of said substrate then being adhesively bonded to another substrate. The adhesive can also be used in a relatively thick layer.

The substrates that are adhesively bonded according to the invention have high stability in respect of temperature, light and weathering. Even under sustained UV irradiation, for example in the case of photovoltaic systems or components thereof, no degradation of the polymers of the adhesive is observed. The adhesion to the substrate is likewise stable. A further advantage is the high flexibility of the adhesive. The adhesive remains elastic even at elevated temperature under external weathering of the adhesively bonded substrates. Possible thermal expansion of the individual substrates does not cause the adhesive bond to break.

The choice of raw materials according to the invention gives rise to silane group-crosslinking adhesives which develop a high initial strength and which thus allow for faster processing. The intermixing of a hardener component gives rise to a rapid crosslinking and full cure. This can also be achieved in a work environment with only low air humidity.

The compositions according to the invention can be used in various sectors. For example, they can be used in the construction sector, as a structural adhesive for plant components, or for the adhesive bonding of flexible films to solid substrates.

EXAMPLES

Example 1: (Amounts in Parts by Weight)

|  | Component A | Component B |
|---|---|---|
| Silane-modified prepolymer | 33 |  |
| Plasticizer 1 | 9 |  |
| Plasticizer 2 |  | 51 |
| Stabilizer | 0.5 |  |
| Rheological auxiliary agent | 3 |  |

-continued

| | Component A | Component B |
|---|---|---|
| 10% tylose solution in water | 0 | 10 |
| Titanium dioxide | 5.6 | |
| Chalk | 40.1 | 39 |
| Light stabilizer | 0.1 | |
| Solid additive | 5.6 | |
| Desiccant | 1.5 | |
| Adhesion promoter | 1.6 | |

Plasticizer 1: Mesamoll
Plasticizer 2: PPG, Acclaim 6300
Stabilizer: Tinuvin 770
Desiccant: VTMO silane
Adhesion promoter: AMMO silane
Rheological auxiliary agent: Disparlon 6500
Solid additive: Arkon P125 (solid hydrocarbon resin)
Prepolymer: Geniosil STP-E30
Chalk: Socal U1S1

Before being applied, components A and B are mixed in a static mixer at 70° C. in a proportion A:B of 10:1. The mixture is applied immediately. After 48 hours the composition has cured and has developed its final mechanical properties.

Comparison:

Example 1: Two-Component Hot-Melt Adhesive

Comparative Example 2: One-Component Hot-Melt Adhesive from WO 2010/108716, Example 1

Comparative Example 3: Commercial Two-Component System in Paste Form

| | Example 1 | Comparative example 2 | Comparative example 3 |
|---|---|---|---|
| Position tack/300 g | + | + | − |
| Position tack/1000 g | + | + | − |
| Shear strength 2 hours | >1 MPa | 0.1 MPa | 0.7 MPa |
| Shear strength 14 days | 2.5 MPa | 2.5 MPa | 2.5 MPa |

Shear strength in accordance with ISO 4587,
Aluminum 99 substrate, 20×25×2 mm
2 hours at 23° C./50% relative humidity, or
14 days at 23° C./50% relative humidity.
Test at 23° C., 50 mm/min
Initial Strength (Position Tack):

The adhesive is applied (2 mm thick) to a cleaned, rigid substrate (Al metal) and adhesively bonded to a second substrate of the same type immediately thereafter. The adhesively bonded surface area is 100×15 mm.

After a waiting time of 5 minutes one substrate part is suspended vertically and the weight (300 g or 1000 g) is attached to the other. The time until the substrate slides off determined. The test is performed at 23° C.

In the case of liquid-viscous adhesives the second substrate slides off after 10 seconds. In the case of hot-melt adhesives (one-component) no rapid shear strength is established. In the case of the example according to the invention both tests are better than in the comparative experiments.

What is claimed is:

1. A moisture-curing two-component composition consisting of:

a component A containing at least one polyoxyalkylene, polyolefin and/or polyacrylate prepolymer having at least one hydrolysable silane group and 0.1 to 20 wt % relative to the weight of the composition of at least one solid inert additive comprising polyamide and optionally another compound selected from the group consisting of hydrocarbons, polyesters or both; and a component B containing at least one crosslinking compound for the prepolymer, component B having a viscosity of 5,000 to 800,000 mPas at 25° C.; and optionally auxiliary substances selected from the group consisting of resin, plasticizer, stabilizer, water-dissolving or water-absorbing substance, pigment, filler, thickening agent and combinations thereof;

the two-component composition and component A each having hot-melt adhesive properties wherein the composition is free of metal catalyst and comprises a catalyst consisting of amine compounds and/or silane adhesion promoters with amino groups.

2. The two-component composition according to claim 1, characterized in that the inert additive has a softening point of 40 to 150° C.

3. The two-component composition according to claim 1, characterized in that component B contains
0 to 30 wt. % of one or more silane-crosslinkable compounds,
2 to 60 wt. % of water-absorbing substances,
10 to 60 wt. % of auxiliary substances and additives,
0.5 to 15 wt. % of water,
wherein the sum is 100%.

4. An adhesive for bonding glass, metal, ceramic, wood and/or plastic substrates comprising the two-component composition according to claim 1.

5. The moisture-curing composition of claim 1 wherein the composition is a hot melt adhesive and component B comprises water and a material having solubility or absorption capacity for water, wherein component B having a viscosity of 20,000 to 800,000 mPas at 25° C.

6. The moisture-curing composition of claim 1 wherein the composition is a hot melt adhesive and a weight ratio of component A to component B ranges from 10 parts A to 3 parts B to 10 parts A to 0.1 parts B.

7. The moisture-curing composition of claim 1 wherein the composition is a hot melt adhesive and components A and B are maintained separately and mixed before use while component A is in a molten state.

8. The moisture-curing composition of claim 1 wherein the composition is a hot melt adhesive and components A and B are maintained separately and mixed before use while component A is in a molten state and the mixed adhesive has a melting point above 25° C. and will solidify without crosslinking below 25° C.

9. The two-component composition according to claim 1, being free of optional auxiliary substances.

10. The two-component composition according to claim 1, wherein the crosslinking compound in component B contains water and/or silane-crosslinkable compounds.

11. The two-component composition according to claim 1, wherein the crosslinking compound in component B contains up to 15 wt. % of water and/or up to 30 wt. % of silane-crosslinkable compounds.

12. An adhesive comprising the two-component composition according to claim 1.

13. Cured reaction products of the two-component composition according to claim 1.

* * * * *